United States Patent [19]

Black

[11] 4,185,846

[45] Jan. 29, 1980

[54] ROUGH TERRAIN CREEPER

[76] Inventor: Odell D. Black, Rte. 1, Box 303, Lexington, N.C. 27292

[21] Appl. No.: 836,603

[22] Filed: Sep. 26, 1977

[51] Int. Cl.[2] .......... B62B 11/00

[52] U.S. Cl. .......... 280/32.6; 280/11.115

[58] Field of Search .......... 280/12.11, 12.12, 218, 280/219, 1.181, 1.183, 32.5, 32.6, 11.11 R

[56] References Cited

U.S. PATENT DOCUMENTS

| | | | |
|---|---|---|---|
| 1,349,941 | 8/1920 | Broome | 280/32.6 |
| 1,615,383 | 1/1927 | Hossell | 280/1.181 |
| 2,513,440 | 7/1950 | Alderson | 280/32.6 X |

FOREIGN PATENT DOCUMENTS

| | | | |
|---|---|---|---|
| 450201 | 8/1948 | Canada | 280/32.6 |
| 282789 | 2/1931 | Italy | 280/218 |

*Primary Examiner*—Philip Goodman

[57] ABSTRACT

This invention relates to a terrain creeper as may be used by mechanics and others when it is necessary for a workman to lie on his back and work in a confined area such as under a house or other restricted spaces.

11 Claims, 14 Drawing Figures

ROUGH TERRAIN CREEPER

BACKGROUND AND OBJECTIVES OF THE INVENTION

Creepers on rollers which are used for example by automobile mechanics and others, which have casters or wheels which roll along a smooth floor or other surface, are well known and have been used for many years with excellent results. Depending upon the wheel size, and the smoothness of the surface on which they are employed the wheeled creepers of various types have been successfully used by workmen who must lie on their backs and "slide" into confined areas, such as under cars or other structures or machinery.

While the wheeled creepers provide good results on smooth surfaces, it has long been a problem of attempting to make the wheeled creepers "slide" (roll) when the ground or floor upon which they are utilized is uneven, bumpy, muddy, contains grass or other vegetation or in general has a rough surface.

With this background in mind the present invention was conceived and one of its objectives is to provide a creeper which can be utilized on a relatively uneven surface such as the ground.

It is another objective of the present invention to provide a terrain creeper which is easy to use and is relatively inexpensive to construct.

It is still another objective of the present invention to provide a creeper which can be moved in either the foreward or backward directions.

It is yet another objective of the present invention to provide a terrain creeper which has relatively few moving parts and is simple to repair.

SUMMARY OF THE INVENTION AND DESCRIPTION OF THE DRAWINGS

This invention consists of a terrain creeper which may be used on the ground or other uneven surfaces. The creeper as shown herein has tracks or sliding members which are moveably connected to the body support member and are used by the operator to move the creeper along the ground by a "walking" method until it arrives at the desired location. The operator can then "brake" or lock the creeper into position, perform the desired work necessary at the location, unlock the tracks and then move either forward or backward to other areas as desired using the same or a reverse "walking" motion.

To "walk" the creeper along the terrain, the user lies on his back on the platform or support of the creeper and pushes with his feet, which extend beyond the platform, against the ground. The platform, being slidably connected to the tracks or runners of the creeper is propelled forward. Resilient members connect the tracks to the upper support platform and by "tilting" the creeper to one side, whereby the pressure is released from one of the tracks, the resilient member joined to that track pulls the runners or track into longitudinal alignment with the support member or platform. The operator next tilts the creeper over onto the aligned track whereby the other track will then be lifted off the ground and be pulled by the resilient means joined to it into alignment with the support platform. The operator then allows the creeper to rest on both tracks which are now longitudinally aligned and repeats the operation of "walking" the creeper either in a forward or backward direction as desired. Resilient members can be positioned to allow the creeper to be moved in either a forward or reverse direction, or both.

As shown in the drawings, FIG. 1 is a perspective view of the terrain creeper of the present invention;

FIG. 2 demonstrates by the use of broken lines the tilting of the creeper to one side;

FIG. 3 demonstrates tilting the creeper to the opposite side of that shown in FIG. 2;

Figure 7:
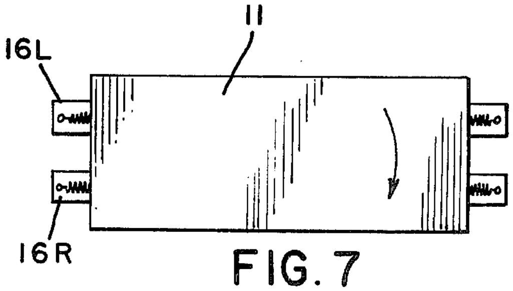
Figure 8:
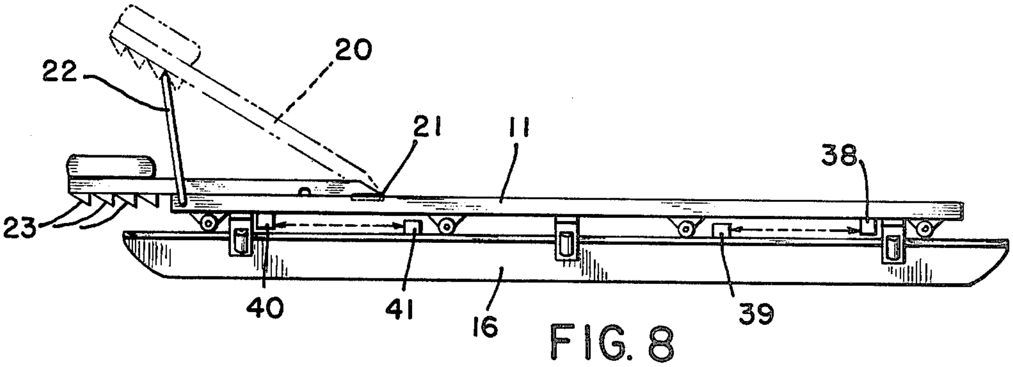
Figure 9:
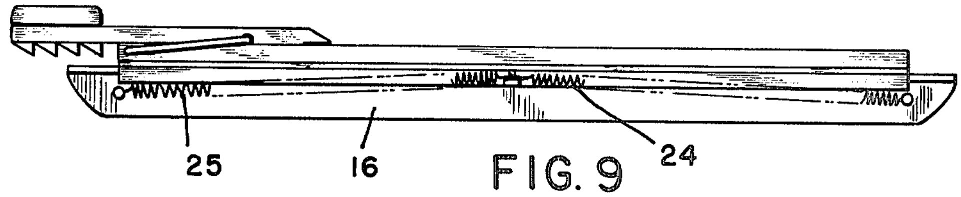
Figure 10:
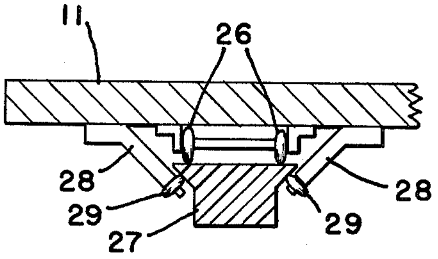
Figure 11:
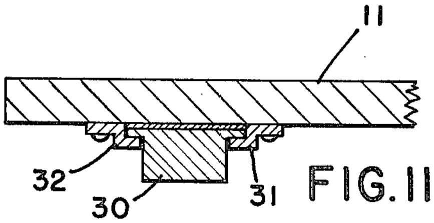
Figure 12:
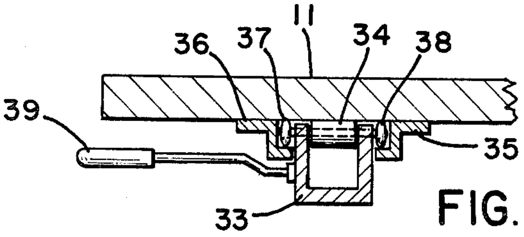

FIG. 7 demonstrates the creeper with both tracks in longitudinal alignment or nonextended position;

FIG. 8 illustrates an alternate embodiment of the creeper with an adjustable head rest;

FIG. 9 demonstrates a side perspective view of another embodiment;

FIG. 10 demonstrates an end view of a track mechanism with rollers;

FIG. 11 demonstrates another embodiment of a sliding track mechanism;

FIG. 12 demonstrates yet another embodiment of a track mechanism.

Figure 13:
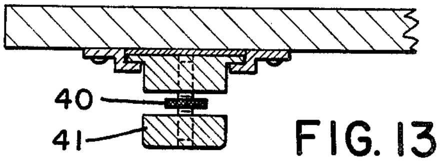

FIG. 13 illustrates an adjustable track means; and

Figure 14:
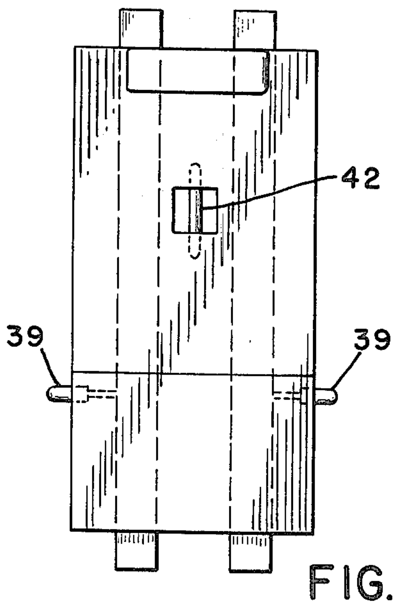

FIG. 14 shows a top view of yet another embodiment.

DETAILED DESCRIPTION OF THE DRAWINGS

This invention is especially useful as a creeper for rough terrains for example where sand, grass, water or other hazards would prevent the use of a wheeled device. As will be shown, the major advantage of applicant's invention resides in its ability to travel over relatively rough terrains due to the track means which are moveably connected to the platform or body support member which allows the operator to "walk" the creeper over rough or uneven surfaces. Of course, the creeper can be used on smooth surfaces also but its primary utilization is in those areas where a wheeled device is inoperable or is only operable with great difficulty.

Figure 1:
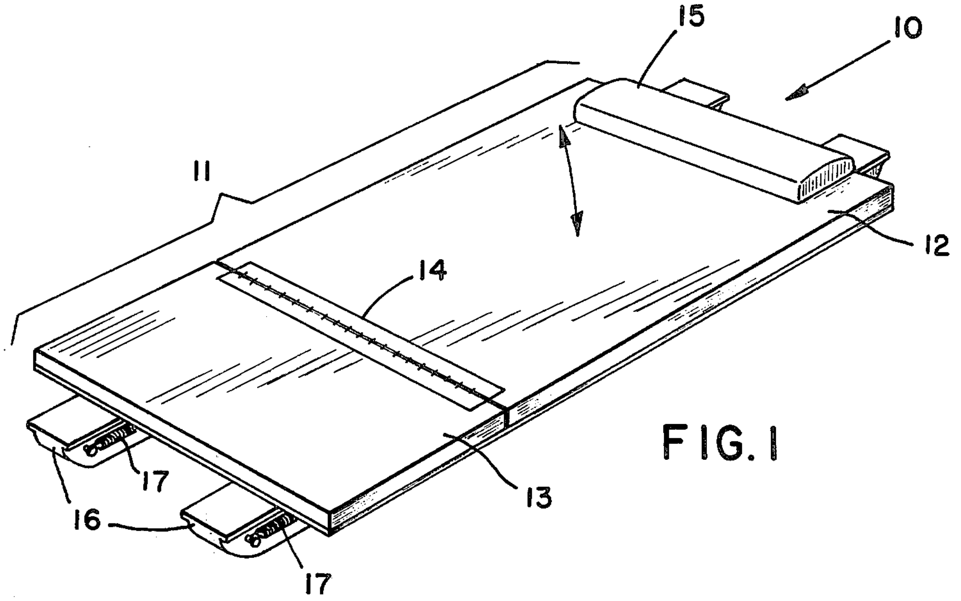

As shown in FIG. 1, creeper 10 includes a plaform or body support member 11 in this the preferred embodiment having back rest 12 and seat member 13 which are pivotably connected by a hinge 14. Included on backrest 12 is head cushion 15 which may be for example a padded vinyl. Backrest 12 can be raised and lowered as desired depending upon the particular angle that the operator requires for his specialized use. Runners or track means 16 are shown in the contracted or normal, longitudinally aligned position with coil spring member 17 being relaxed or contracted. Each track means or runner 16 operates independently and can be extended individually in either a forward or backward direction.

Figure 4:
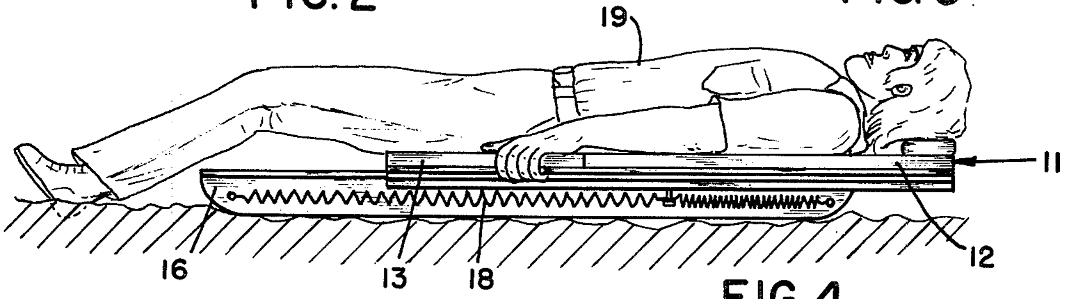
FIG. 4 illustrates an operator with the platform extended forward of the runners.

In operation, the user lies face-up on body support member 11, places his feet on the ground or on another stable object and pushes forward (forward as used herein means from the operator's feet toward the operator's head). This forward motion causes the body support member 11 to moveably extend beyond the track means 16 as shown in FIG. 4, from the longitudinally aligned position stretching resilient member 18. The track means or runners 16 of which there may be one or more are then urged toward body support member 11 by the resilient members in an effort to return them to the longitudinally aligned configuration. However, the weight of the operator 19 prevents runners 16 from returning due to the downward force of his weight.

Figure 2:
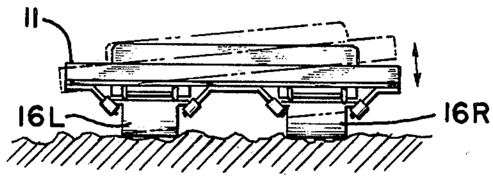

In order for the runners or track means to return, the operator shifts his weight to, for example the left side as would occur in FIG. 2 (shown without the operator). Resilient member (not shown) would then urge the right runnder 16 R to its normal or nonextended position while the left runner 16L remains in its extended, lagging position behind the body support member 11.

Figure 3:
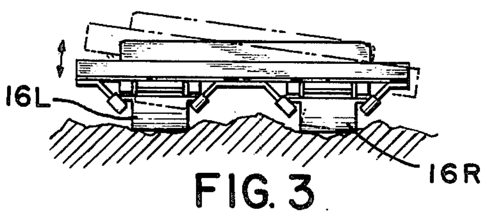

The operator now rolls his weight to the right side of the creeper and the weight is shifted to runner 16R as shown in FIG. 3. (This illustration is also shown without the operator positioned thereon). As the operator's weight shifts to the right side of the creeper, runner 16L lifts from the ground as shown in the dotted line illustration and the resilient member (not shown) then draws track means 16L to its longitudinally aligned position. The operator then rolls his weight to the center of the body support member 11 and both runners (16R and 16L) then rest again on the ground. The process is repeated as many times as the operator wishes to propel or "walk" the creeper forward.

Figure 5:
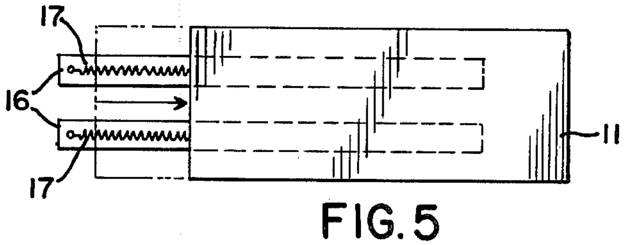
FIG. 5 illustrates a top view of the platform as positioned in FIG. 4.

In FIG. 5, the creeper is in its extended form with body support member 11, advanced of track means 16 with coil springs 17 shown extended or stretched.

Figure 6:
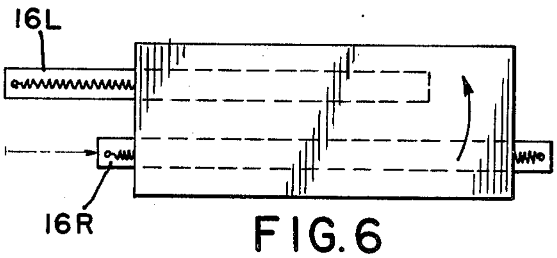
FIG. 6 illustrates the platform having one runner extended.

As shown in FIG. 6 the operator (not shown) has now shifted his body weight to runner 16L and runner 16R is in its normal or aligned position. Subsequently, as the operator shifts his body weight to the right side or to runner 16R, then runner 16L will also contract as shown in FIG. 7.

Various embodiments and modifications are possible and as shown in FIG. 8, an adjustable headrest 20 is attached which may assist the operator as he works in confined areas, such as under houses, machinery, or other difficult working environments. As can be seen the adjustable headrest 20 is connected to body support member 11 by pivot means 21 which may be a hinge, or other suitable device. Locking bar 22 is engageable with teeth means 23 for adjustment by the operator of the desired height and angle of headrest 20.

Terminal stop means may be employed on any of the embodiments shown to limit the relative movement between the runners and the body support member and to prevent excess stretching of the resilient members and to extend their useful life. In FIG. 8, stop means 38 contacts bar member 39 to terminate the relative movement between runner 16 and body support member 11 during forward movement of the creeper. During reverse movement stop means 40 terminates the relative movement between body support member 11 and runner 16 by contacting bar member 41.

As earlier mentioned, the creeper may be moved either in a forward or reverse direction and as shown in FIG. 9, when body support member 11 is extended in a forward direction spring member 24 would be first elongated or stretched, then relaxed. Likewise, when the creeper is "walked" in a reverse direction, spring member 25 would first be stretched. In addition to the dual spring members which are shown attached to runner 16 in FIG. 9 other modifications are possible including braking means or runners 16 which prevents body support member 11 and runners or track means 16 from moving relative to each other and as such are useful when the creeper has been positioned for stationary use in one location.

Sideways or lateral movement may also be obtained by utilizing the same principals heretofore explained by having tracks which are moveably attached to move laterally to the creeper. It is believed that one skilled in the art can equip the creeper with lateral moving ability with relative ease and particular embodiments demonstrating lateral moving track means are not illustrated herein.

Various track means or runners are possible in both the number of runners and the types employed. One, two, three or more runners are possible for use with the present invention as are flexible runners which may be "bent" or steered in a curved fashion for moving the creeper in a curved path and all are within its scope.

In FIG. 10, body support member 11 is shown with rollers 26 which may contain ball bearings for even, smooth operation. Rollers 26 are mounted on runner or track means 27 and track means 27 is maintained directionally straight with the assistance of guiding means 28 which includes guiding wheels 29 which rotate for smooth, even motion.

Another embodiment of the track means is shown in FIG. 11 in which T-shaped track means 30 is shown slidably engageable with body support member 11. Channel means 31 and 32 are rigidly connected to body support member 11 and maintain runner 30 in proper alignment and for example may be teflon coated to aid in the reduction of friction during engagement with track means 30.

Yet another embodiment of the runner or track means is shown in FIG. 12 in which U-shaped track means 33 is shown with attached roller 34. Body support member 11 as shown contacts roller member 34 whereupon friction is reduced between the moveable track means and body support member during operation. Although only one roller mean 34 is shown any number may be used throughout the length of track means 33 and the number and size of the roller means are not deemed important for the purposes of this invention but can be selected depending upon the materials available and individual operating characteristics desired. Within channel members 35 and 36 are channel rollers 37 and 38 which aid in a smoother movement between the track means and the body support member 11 though proper lubrication and material selection may eliminate the necessity for the channel rollers.

Lever means 39 is shown in FIG. 12 which can be used by the operator to move the creeper in a backward direction for embodiments of the creeper having only one resilient member attached for forward motion. The lever means 39 is used by the operator by shifting his weight off of one track means and by grasping and pushing the lever 39 "backward" in the rearward direction with the track means to which it is attached, "hand extending" that track means. The weight of the operator is then shifted to the "hand extended" track means and the other track means can then be "hand extended" since the body weight would then be removed from it. With both track means extended (in those embodiments utilizing two track means) the body support member can then be urged into longitudinally aligned condition with the track means. These steps are then repeated as necessary for additional rearward movements as required.

In FIG. 13 extendable member 40 is shown by which track means 41 can be adjusted and may be raised or lowered as desired by the operator depending upon the operating space available and working conditions.

In FIG. 14 handle 42 is shown located in a convenient location below the top surface of the body support member which will allow the operator to grasp and move the creeper easily, for example as may be used in shifting the direction of the creeper under a house or machinery, or when lifting the creeper is required to place it on a truck or other vehicle for transportation.

Various modifications and improvements can be incorporated and it is understood that the illustrations shown herein are not for the purpose of limiting the invention.

I claim:

1. A low profile terrain creeper comprising: a body support member suitably adapted for lying thereon, a ground engaging track means, said track means being guidably connected to said body support member for longitudinal parallel movement thereto, said body support member being movable beyond said track means to an extended position from a longitudinal aligned position, and a resilient member, said resilient member being joined to said track means and to said body support member for urging said track means from said extended position to said aligned position whereby the creeper can be walked along by successively extending and aligning said body support member relative to said track means.

2. A terrain creeper as claimed in claim 1, wherein said body support member includes a pivotable section.

3. A terrain creeper as claimed in claim 1 wherein said track means comprises a pair of tracks.

4. A terrain creeper as claimed in claim 1, and including track guide means.

5. A terrain creeper as claimed in claim 1, wherein the body support member includes roller means.

6. A terrain creeper as claimed in claim 1 wherein said track means comprises a T-shaped track.

7. A terrain creeper as claimed in claim 1, wherein said resilient member comprises a coiled spring.

8. A terrain creeper as claimed in claim 2, wherein said track guide means includes a rotating member.

9. A terrain creeper as claimed in claim 1, and including handle means.

10. A terrain creeper as claimed in claim 1 and including a lever whereby said track means may be extended by hand.

11. A terrain creeper as claimed in claim 1 wherein said track means are moveable lateral to said creeper.

* * * * *